(12) United States Patent
Yu et al.

(10) Patent No.: US 10,704,701 B1
(45) Date of Patent: Jul. 7, 2020

(54) VACUUM ELECTRICALLY CONTROLLED PROPORTIONAL VALVE

(71) Applicant: TAIWAN CHELIC Co., Ltd., New Taipei (TW)

(72) Inventors: Ping-Cheng Yu, New Taipei (TW); Chih-Sheng Cheng, New Taipei (TW); Yu-Li Chen, New Taipei (TW)

(73) Assignee: TAIWAN CHELIC CO., LTD., New Taipei (TW)

( * ) Notice: Subject to any disclaimer, the term of this patent is extended or adjusted under 35 U.S.C. 154(b) by 0 days.

(21) Appl. No.: 16/387,543

(22) Filed: Apr. 18, 2019

(30) Foreign Application Priority Data

Mar. 7, 2019 (TW) .............................. 108107535 A

(51) Int. Cl.
| | |
|---|---|
| *F16K 31/128* | (2006.01) |
| *F16K 17/04* | (2006.01) |
| *F16K 27/02* | (2006.01) |
| *F16K 31/04* | (2006.01) |
| *F16K 15/18* | (2006.01) |
| *F16K 51/02* | (2006.01) |
| *G05D 16/20* | (2006.01) |

(52) U.S. Cl.
CPC .......... *F16K 17/048* (2013.01); *F16K 15/186* (2013.01); *F16K 27/029* (2013.01); *F16K 31/046* (2013.01); *F16K 51/02* (2013.01); *F15B 2211/50509* (2013.01); *F15B 2211/565* (2013.01); *G05D 16/2013* (2013.01); *G05D 16/2095* (2019.01); *G05D 16/2097* (2019.01)

(58) Field of Classification Search
CPC .... F16K 17/048; F16K 15/186; F16K 27/029; F16K 31/046; F16K 51/02; F15B 2211/565; F15B 2211/50509; F15B 2211/635; G05D 16/2095; G05D 16/2097

USPC ...... 137/487.5, 487, 565.14, 565.16, 565.23, 137/596.16, 486, 14, 505.15, 505.36, 137/489.5, 492, 492.5, 625.64

See application file for complete search history.

(56) References Cited

U.S. PATENT DOCUMENTS

| | | | | | |
|---|---|---|---|---|---|
| 2,637,946 | A | * | 5/1953 | Parks | .................. G05D 16/163 137/489.5 |
| 4,638,837 | A | * | 1/1987 | Buike | ...................... B62D 5/06 137/596.16 |
| 5,586,575 | A | * | 12/1996 | Bergamini | .......... F15B 13/0438 137/488 |

(Continued)

*Primary Examiner* — Minh Q Le
(74) *Attorney, Agent, or Firm* — Leong C. Lei

(57) ABSTRACT

A vacuum electrically controlled proportional valve includes a valve seat coupled to a guide seat. The guide seat is connected, at a top thereof, to a vacuum pressure electromagnetic valve, an atmospheric pressure electromagnetic valve, and a sensor. A main diaphragm is sandwich between the seat valve and the guide seat to define a vacuum pressure chamber. A pilot discharge straight rod that is provided with a vacuum valve gate assembly is fit to a center of the main diaphragm. A master channel through which a primary-side pressure and a secondary-side pressure flow is provided. A regulation channel is provided and controlled by the vacuum pressure electromagnetic valve and the atmospheric pressure electromagnetic valve. A pilot atmosphere channel is connected to a space under the main diaphragm. A first and a second vacuum destruction valve gates are provided for adjusting, in stage-wise manner, the level of vacuum pressure.

3 Claims, 11 Drawing Sheets

(56) References Cited

U.S. PATENT DOCUMENTS

| | | | | |
|---|---|---|---|---|
| 5,887,847 | A * | 3/1999 | Holborow | F16K 31/128 |
| | | | | 251/33 |
| 6,305,401 | B1 * | 10/2001 | Uehara | G05D 16/2095 |
| | | | | 137/102 |
| 6,338,358 | B1 * | 1/2002 | Watanabe | G05D 16/2093 |
| | | | | 137/102 |
| 6,779,541 | B2 * | 8/2004 | Inayama | G05D 16/2095 |
| | | | | 137/102 |
| 8,409,214 | B2 * | 4/2013 | Lonky | A61M 1/08 |
| | | | | 606/123 |
| 8,847,103 | B2 * | 9/2014 | Retnaswamy | B23K 10/00 |
| | | | | 219/121.54 |
| 9,062,798 | B2 * | 6/2015 | Neef | F16K 47/04 |
| 2002/0036013 | A1 * | 3/2002 | Inayama | G05D 16/2024 |
| | | | | 137/487.5 |
| 2006/0097644 | A1 * | 5/2006 | Kono | G05D 16/206 |
| | | | | 315/111.21 |
| 2012/0204974 | A1 * | 8/2012 | Sakasegawa | G05D 7/005 |
| | | | | 137/486 |
| 2014/0358303 | A1 * | 12/2014 | Leonard | G05D 16/2053 |
| | | | | 700/283 |
| 2014/0358304 | A1 * | 12/2014 | Muir | G05D 16/2053 |
| | | | | 700/283 |
| 2015/0224620 | A1 * | 8/2015 | Takahashi | B24B 37/30 |
| | | | | 451/442 |
| 2017/0351275 | A1 * | 12/2017 | Ito | G05D 16/2053 |

* cited by examiner

VACUUM ELECTRICALLY CONTROLLED
PROPORTIONAL VALVE (a) TECHNICAL FIELD OF THE INVENTION

The present invention relates to a vacuum electrically controlled proportional valve, which uses a pilot discharge straight rod and a vacuum valve gate assembly arranged in an interior thereof, together with a pilot atmosphere channel that conducts in an atmospheric pressure, to allow the pilot discharge straight rod to carry out adjustment of a vacuum level in a two-staged manner, so as to achieve the purposes of energy saving and accurate regulation.

(b) DESCRIPTION OF THE PRIOR ART

Heretofore, a vacuum electrically controlled proportional valve that is widely used in the field of automatized facility, as shown in FIG. 11, generally comprises a prior art setting hole (91) for sucking an object, a prior art vacuum hole (92) for connection with a vacuum pump, and a prior art atmosphere hole (93) for adjusting a vacuum pressure, wherein, generally, with an operation of the vacuum pump, an internal channel of the vacuum electrically controlled proportional valve draws in the pressure and flow of the prior art setting hole (91) to flow toward the prior art vacuum hole (92) to form vacuum, as indicated by arrows provided in the drawing.

To carry out a test operation of a vacuum electrically controlled proportional valve, an operator must rely on long-term experience and repeated testing to make a perfect vacuum electrically controlled proportional valve. However, a circuit formed in the structure of the vacuum electrically controlled proportional valve is relatively complicated, making it necessary to connect vacuum pressure pipes and facility that is provided for testing operations in a manner of 90 degree bending. For a test operator, additional time and effort must be spent because connecting the vacuum pressure pipes and the test facility to carry out test cannot be accompanied through a straightforward-entry and straightforward-exit manner of assembling.

In view of the internal circuit of the prior art vacuum electrically controlled proportional valve, modification of the interior pneumatic circuit requires expenses of time and money for making improvement. Although the connection with an external test vacuum pressure pipeline can be modified and changed, there are still tests that must be carried out for various parts and components. Parts for regulation and control of vacuum must be re-designed in order to preserve the accuracy of vacuum control that was originally possessed. Thus, various improvements are further desired.

SUMMARY OF THE INVENTION

The present invention provides a vacuum electrically controlled proportional valve, of which a technical purpose is to use a first vacuum destruction valve gate of a pilot discharge straight rod that is arranged in an interior of a valve seat and a second vacuum destruction vale gate that is arranged in combination with a vacuum valve gate to simplify a complicated circuit of an interior structure of a vacuum electrically controlled proportional valve and achieve accurate adjustment of a level of vacuum pressure and shortening of response time by using the first vacuum destruction valve gate and the second vacuum destruction valve gate.

The present invention provides a vacuum electrically controlled proportional valve, which is structured such that a valve seat is provided, atop thereof, with a main diaphragm, wherein through coupling with a guide seat, the main diaphragm is interposed therebetween to form a vacuum pressure chamber, the main diaphragm being provide atop thereof with an elastic element, the main diaphragm being fit, at a center thereof, to a pilot discharge straight rod, the pilot discharge straight rod being provided with a vacuum valve gate assembly, the guide seat being provided, atop thereof, with a vacuum pressure electromagnetic valve, an atmospheric pressure electromagnetic valve, and a sensor and also having a regulation channel connected to and in communication with a top of the vacuum pressure chamber and controlled by the vacuum pressure electromagnetic valve and the atmospheric pressure electromagnetic valve, a pilot atmosphere channel being formed in the valve seat and connected to and in communication with a space below the main diaphragm for an atmospheric pressure to flow, a master channel being additionally formed between the valve seat and the guide seat, the master channel allowing a primary side pressure and a secondary side pressure to flow therein, the master channel being provided therein with a guide channel that is controlled by the vacuum pressure electromagnetic valve and a feedback channel that is connected to the sensor.

The pilot discharge straight rod is provided with a first vacuum destruction valve gate above the valve seat, and the vacuum valve gate assembly is provided on a top thereof, in combination with the pilot discharge straight rod, with a second vacuum destruction valve gate, wherein when the primary side pressure passes through the guide channel, in collaboration with an operation of the vacuum pressure electromagnetic valve to generate a vacuum pressure in the vacuum pressure chamber, the main diaphragm is forced upward and drives the pilot discharge straight rod to thereby drive a main valve gate on a lower part of the vacuum valve gate assembly to open, allowing the primary side pressure to pass through the main valve gate to form the secondary side pressure thereby achieving the purposes of vacuum suction, until the main diaphragm is moved downward to a horizontal position, driving the pilot discharge straight rod to have the main valve gate closed, thereby achieving a steady pressure state.

Activation of the atmospheric pressure electromagnetic valve allows the external atmospheric pressure to be conducted in through the regulation channel, causing a pressure applied to the main diaphragm for downward movement, setting the first vacuum destruction valve gate to an open state, allowing a part of the atmospheric pressure to pass for reducing a power of vacuum suction. When the atmospheric pressure electromagnetic valve continuously conducts in atmospheric pressure, the second vacuum destruction valve gate is caused to open, allowing more atmospheric pressure to pass, shortening a response time of vacuum suction to thereby achieve the purposes of energy saving and accurate regulation.

DETAILED DESCRIPTION OF THE PREFERRED EMBODIMENTS

Figure 1:
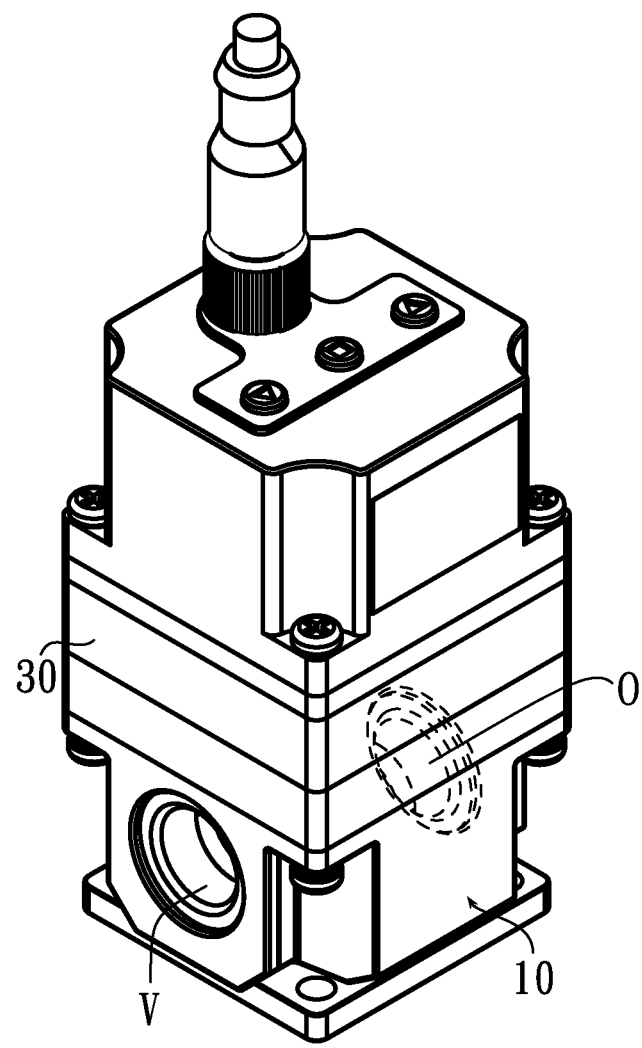
FIG. 1 is a perspective view of the present invention.

A preferred feasible embodiment according to the present invention will be described in detail in the following, with reference being had to FIG. 1-4, to provide a better understanding of the present invention.

The present invention is a vacuum electrically controlled proportional valve, which has a structure comprising: a valve seat (10), which is connected, at a top thereof, to a guide seat (30) with a main diaphragm (11) interposed between the guide seat (30) and the valve seat (10) to form a vacuum pressure chamber (12) and an elastic element (111) being provided on the main diaphragm (11), the elastic element (111) being a spring, the main diaphragm (11) being fit, at a center thereof, to a pilot discharge straight rod (20), the pilot discharge straight rod (20) being provided with a vacuum valve gate assembly (21). The vacuum valve gate assembly (21) is formed of two convex members (22) that are arranged with convex surfaces thereof facing each other and in combination with a spring (23). The convex members (22) each have an interior made in a penetrating configuration to receive the pilot discharge straight rod (20) to be fit therein. The pilot discharge straight rod (20) is provided with a position-constraining projecting pawl (204) at each of two portions, an upper one and a lower one, of a circumference thereof in order to provide constraints to strokes of upward and downward movements of the pilot discharge straight rod (20).

The guide seat (30) is further connected, on a top side thereof, to a vacuum power pressure electromagnetic valve (31) and an atmospheric pressure electromagnetic valve (32), and a sensor (33), and also has a regulation channel (121) that is connected to and in communication with a top of the vacuum pressure chamber (12) and is controlled of opening and closure by means of the vacuum pressure electromagnetic valve (31) and the atmospheric pressure electromagnetic valve (32).

A pilot atmosphere channel (122) is formed in the valve seat (10) and connected to and in communication with a space below the main diaphragm (11) for an atmospheric pressure (PP) to flow therein. A master channel (40) is provided between the valve seat (10) and the guide seat (30). The master channel (30) allows a primary side pressure (P1) and a secondary side pressure (P2) to flow therein. The master channel (40) is provided therein with a guide channel (101) that is controlled by the vacuum pressure electromagnetic valve (31) and a feedback channel (102) that is connected to the sensor (33).

The pilot discharge straight rod (20) is provided with a first vacuum destruction valve gate (201) above the valve seat (10), and the vacuum valve gate assembly (21) is provided on a top thereof, in combination with the pilot discharge straight rod (20), with a second vacuum destruction valve gate (202). When the primary side pressure (P1) passes through the guide channel (101), in collaboration with an operation of the vacuum pressure electromagnetic valve (31) to generate a vacuum pressure (PT) in the vacuum pressure chamber (12), the main diaphragm (11) is forced upward and drives the pilot discharge straight rod (20) to thereby drive a main valve gate (203) on a lower part of the vacuum valve gate assembly (21) to open, allowing the primary side pressure (P1) to pass through the main valve gate (203) to form the secondary side pressure (P2) thereby achieving the purposes of vacuum suction, until the main diaphragm (203) is moved downward to a horizontal position and the pilot discharge straight rod (20) is caused to drive the main valve gate (203) to close, and thus a steady pressure state is achieved.

When the atmospheric pressure electromagnetic valve (32) is activated to cause a pressures to apply, by way of the regulation channel (121), to cause the main diaphragm (11) to move downward, the atmospheric pressure (PP) passes through the pilot atmosphere channel (122) to the first vacuum destruction valve gate (201) that is open, allowing a part of the atmospheric pressure (PP) to pass, so as to reduce the power of vacuum suction, and when the atmospheric pressure (PP) is continuously input, the second vacuum destruction valve gate (202) is caused to open, allowing more atmospheric pressure (PP) to pass and to further reduce the response time of vacuum suction.

Figure 2:
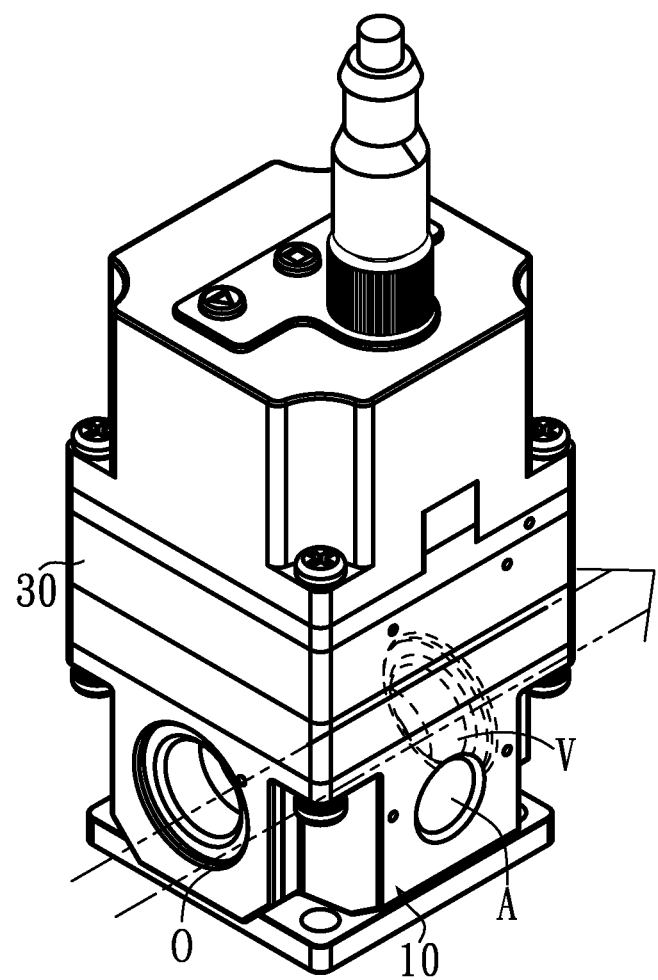
FIG. 2 is another perspective view of the present invention taken from a different direction.

Referring to FIGS. 1-2 of the drawings, the valve seat (10) is provided with connection terminals, which are respectively a setting hole (O) for sucking an object, a vacuum hole (V) for connecting a vacuum pump, and an atmosphere hole (A) for regulation for atmospheric pressure, wherein by means of the arrangement of the internal structure, a test pipeline can be connected such that entry through the setting hole (O) and exit through the vacuum hole (V) are made in a straightforward manner without any need of using a 90-degree bending that is found in an existing structure to carry out a test in an extraordinary manner, whereby inconvenience of carrying out a complicated operation of test can be improved.

Figure 3:
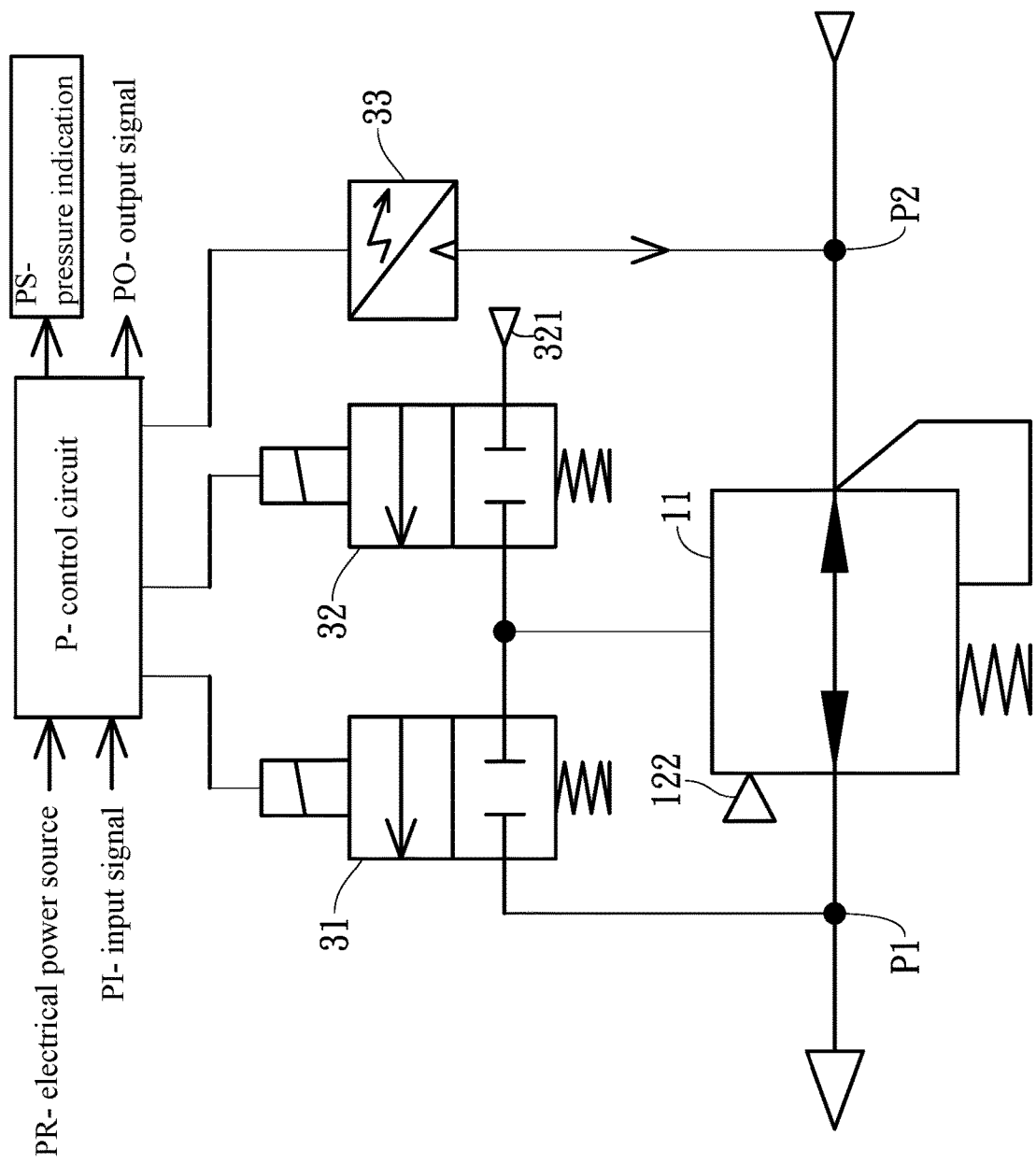
FIG. 3 is a schematic view of a circuit of the present invention.
Figure 4:
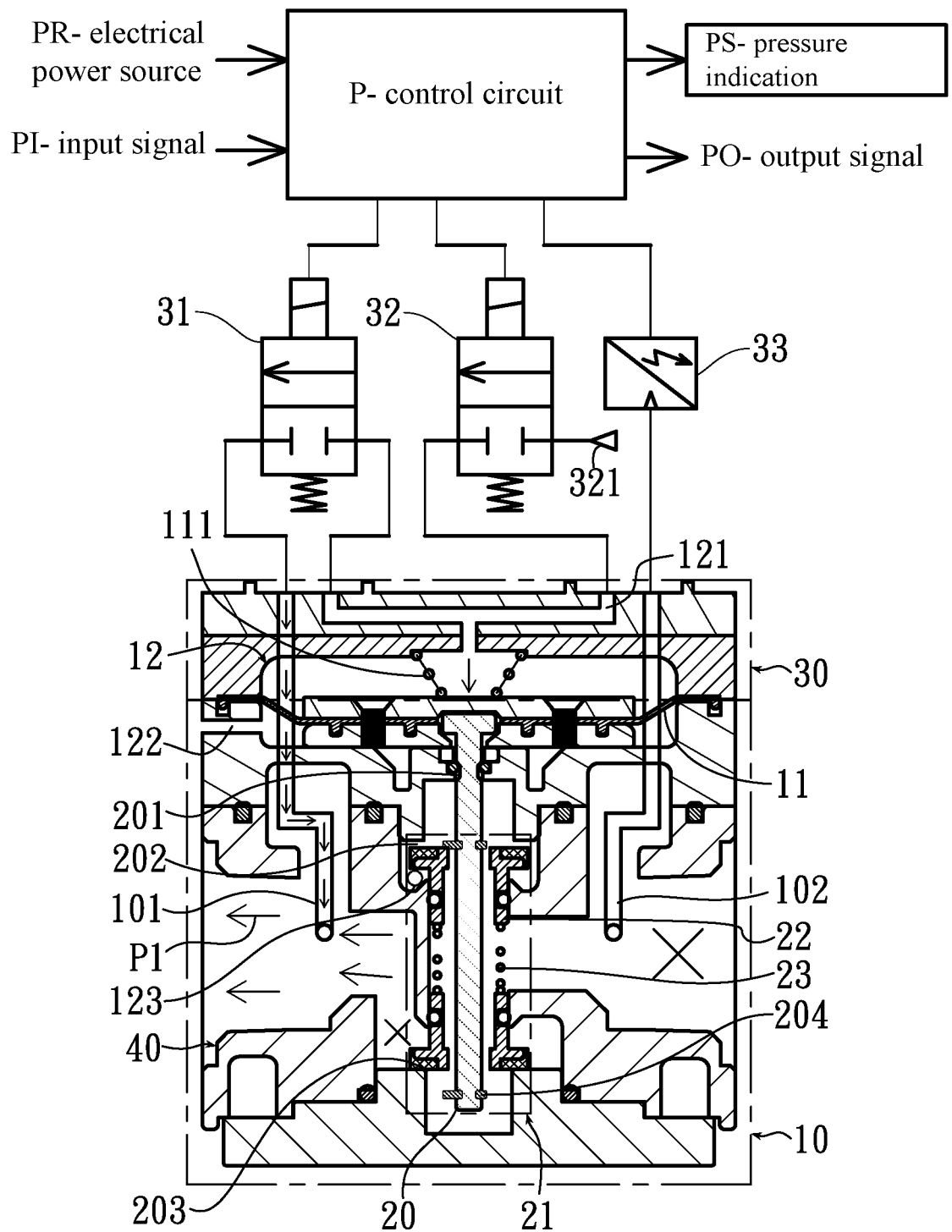
FIG. 4 is a schematic view illustrating a standby state of the present invention.

Referring to FIGS. 3-4 of the drawings, the vacuum pressure electromagnetic valve (31), the atmospheric pressure electromagnetic valve (32), and the sensor (33) are driven by an electrical power source (PR) by way of a control circuit (P). Once an input signal (PI) and an output signal (PO) are set up and the control circuit (P) displays pressure indication (PS), with which the vacuum pressure electromagnetic valve (31) and the atmospheric pressure electromagnetic valve (32) are put into operation. The sensor (33) is operable to detect the pressure level of the secondary side pressure (P2), and in case of exceeding or being lower than a setting value of the secondary side pressure (P2), information is fed back to the control circuit (P) to carry out determination between the vacuum pressure electromagnetic valve (31) and the atmospheric pressure electromagnetic valve (32) and to drive subsequent control operations by means of the control circuit (P), this being a well-known operation of control, so that no detail is provided.

Referring to FIG. 4 of the drawings, which is a standby state of the present invention, the vacuum pressure electromagnetic valve (31) and the atmospheric pressure electromagnetic valve (32) are both in a non-activated condition and the main valve gate (203) in the interior of the master channel (40) is closed. Apart of the atmospheric pressure (PP) of the pilot atmosphere channel (122) flows to the underside of the main diaphragm (11), but the main diaphragm (11) is acted upon by elastic preloading of the elastic element (111) arranged at the top side so that the main diaphragm (11) maintains below the horizontal and the atmospheric pressure (PP) flows through the first vacuum destruction valve gate (201) to the secondary side pressure (P2), and under this condition, the secondary side pressure (P2) is equal to the atmospheric pressure (PP). The horizontal, as used herein, is defined, under the condition that two ends of the main diaphragm (11) are taken as a reference, as being comparison of a central portion of the main diaphragm (11) with the two ends.

Figure 5:
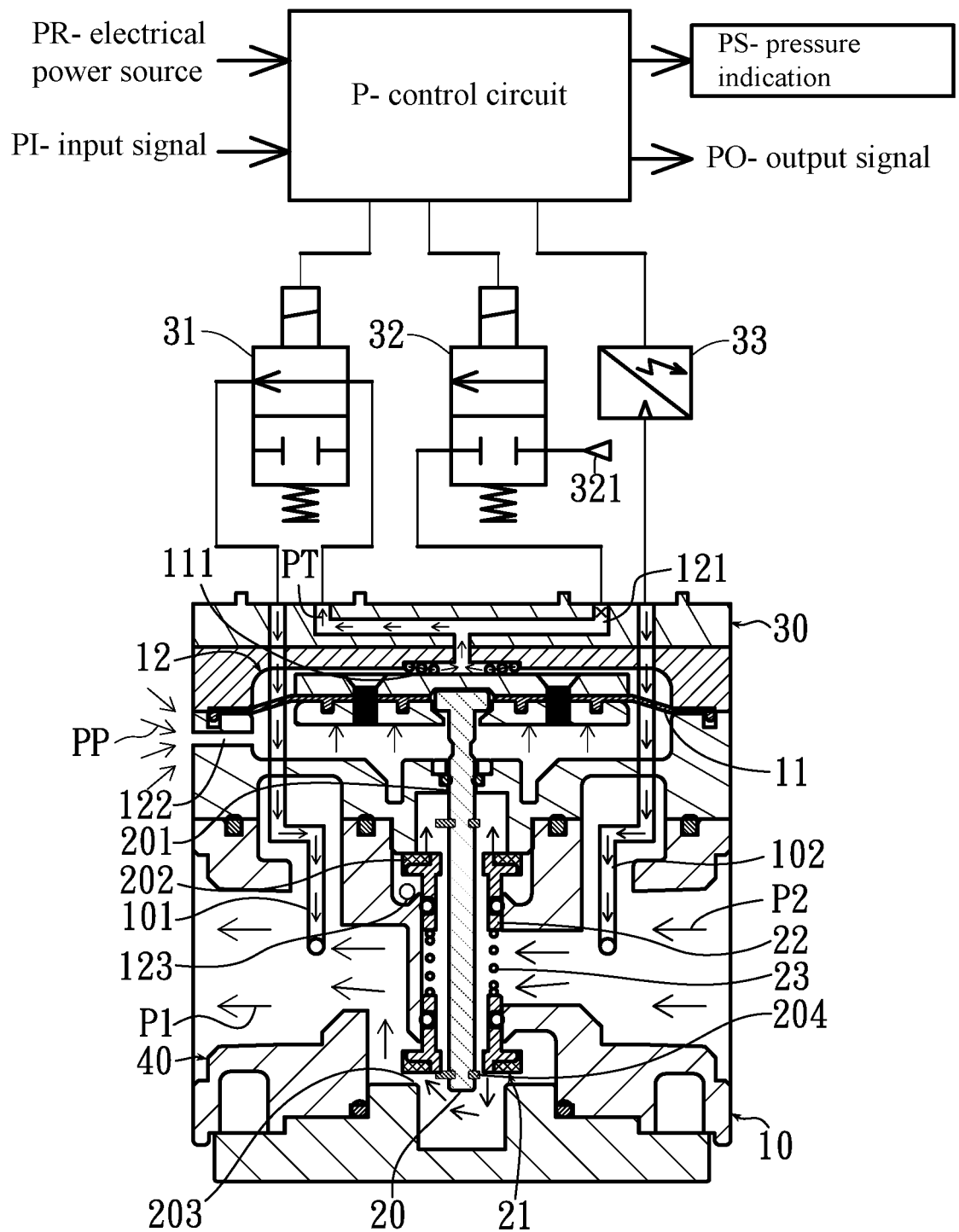
FIG. 5 is a schematic view illustrating an operation state of the present invention.

Referring to FIG. 5 of the drawings, which is an operation state, firstly, the vacuum pressure electromagnetic valve (31) is activated and a vacuum pressure (PT) generated through the regulation channel (121) so that the main diaphragm (11) is caused to move upward to become located above the horizontal. The elastic element (111) is compressed by the main diaphragm (11) so that the atmospheric pressure (PP) that initially flows in through the pilot atmospheric channel (122) is allowed to reach a location under the main diaphragm (11) to thereby maintain the main diaphragm (11) at the current location of being above the horizontal. The primary side pressure (P1) flows through the guide channel (101) into the vacuum pressure electromagnetic valve (31). When the previously mentioned vacuum pressure chamber (12) that is located above main diaphragm (11) generates a vacuum pressure (PT), the main diaphragm (11) moves upward and drives the pilot discharge straight rod (20) and causes the main valve gate (203) on the lower part of the vacuum valve gate assembly (21) to open, allowing the primary side pressure (P1) to pass through the main valve gate (203) to form the secondary side pressure (P2), thereby achieving the purpose of vacuum suction.

Figure 6:
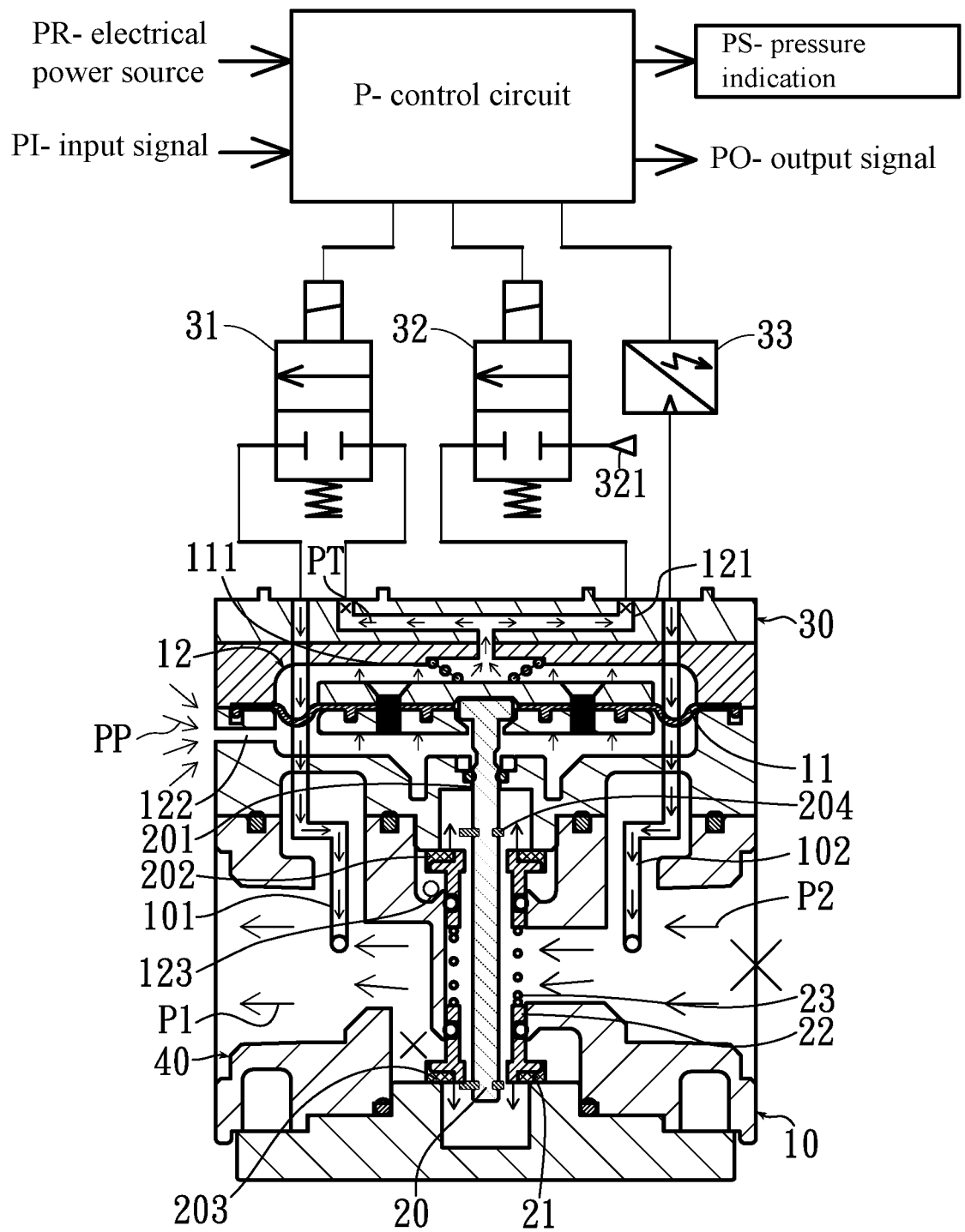
FIG. 6 is a schematic view illustrating a steady pressure state of the present invention.

Referring to FIG. 6 of the drawings, which is a steady pressure state, upon accomplishment of the purpose of vacuum suction, the sensor (33) transmits related information to the control circuit (P), so that the vacuum pressure electromagnetic valve (31) is closed and the vacuum pressure (PT) inside the vacuum pressure chamber (12) and the regulation channel (121) keeps steady vacuum pressure, and under such a condition, the elastic element (111) and the atmospheric pressure (PP) entering through the pilot atmosphere channel (122) apply forces against each other to the main diaphragm (11), making the main diaphragm (11) resume to the horizontal and the main valve gate (203) related thereto is caused to close due to displacement of the pilot discharge straight rod (20) moving the vacuum valve gate assembly (21), thereby keeping vacuum in the entire interior of the valve seat (10).

Figure 7:
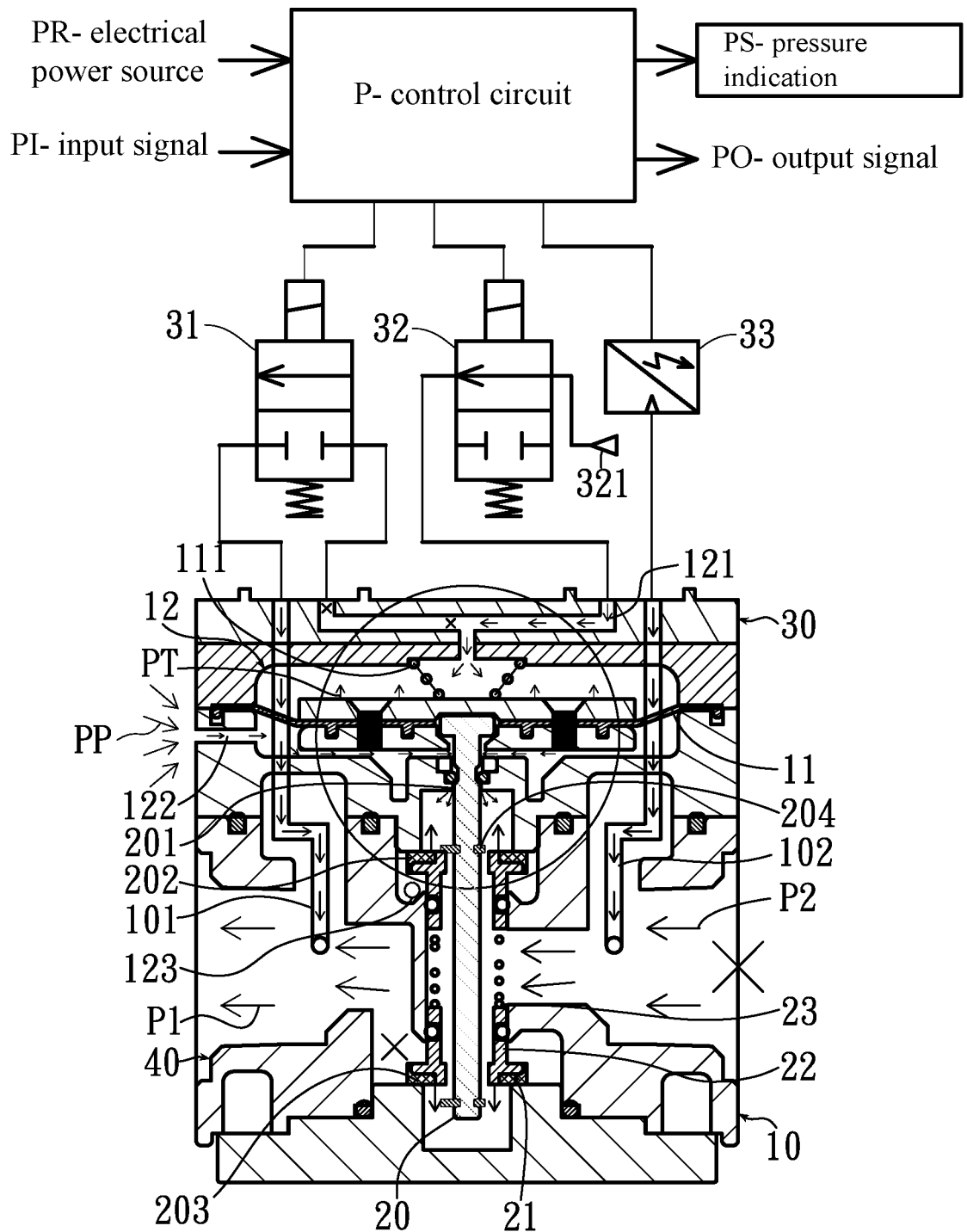
FIG. 7 is a schematic view illustrating a first stage of a vacuum destruction state of the present invention.
Figure 8:
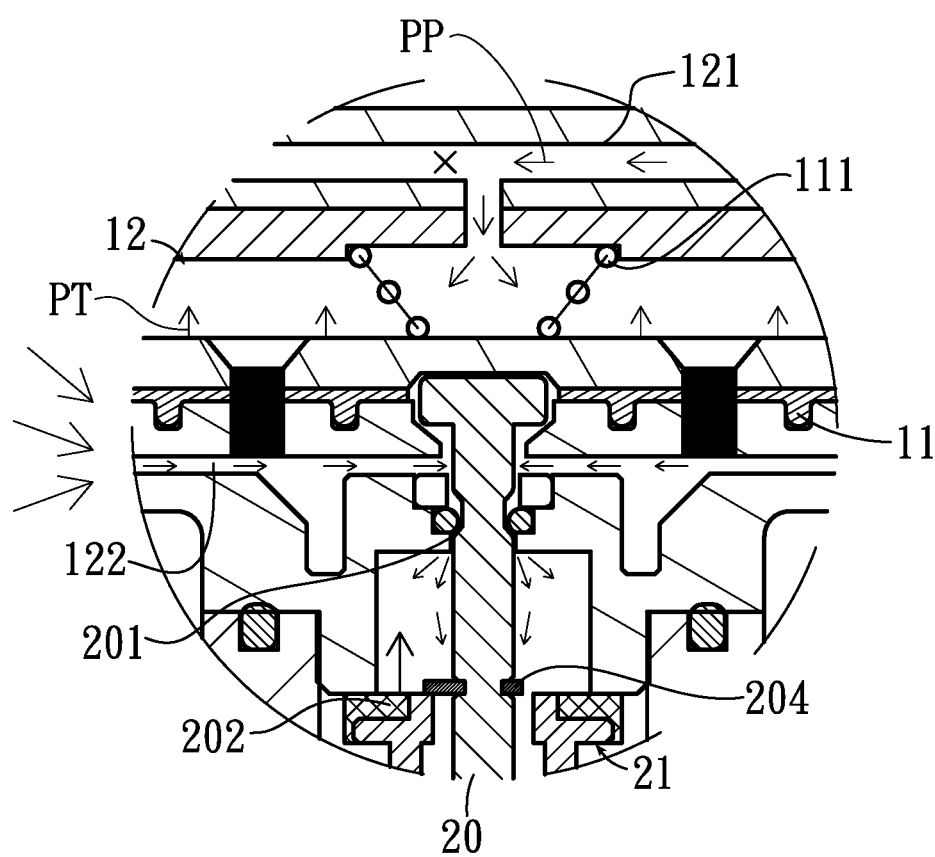
FIG. 8 is an enlarged view of a portion of FIG. 7 of the present invention.

Referring to FIGS. 7 and 8 of the drawings, which is a first stage of vacuum destruction, the atmospheric pressure electromagnetic valve (32) is activated and the external atmospheric pressure (PP) is conducted in through an atmosphere opening (231), passing through the regulation channel (121) to enter the interior of the vacuum pressure chamber (12), making the main diaphragm (11) that was originally kept at the horizontal moving downward to gradually open the first vacuum destruction valve gate (201), allowing the atmospheric pressure (PP) inside the pilot atmospheric channel (122) to move down along the pilot discharge straight rod (20) to pass through the first vacuum destruction valve gate (201), so as to proceed with a minute regulation operation of the interior vacuum level.

Figure 9:
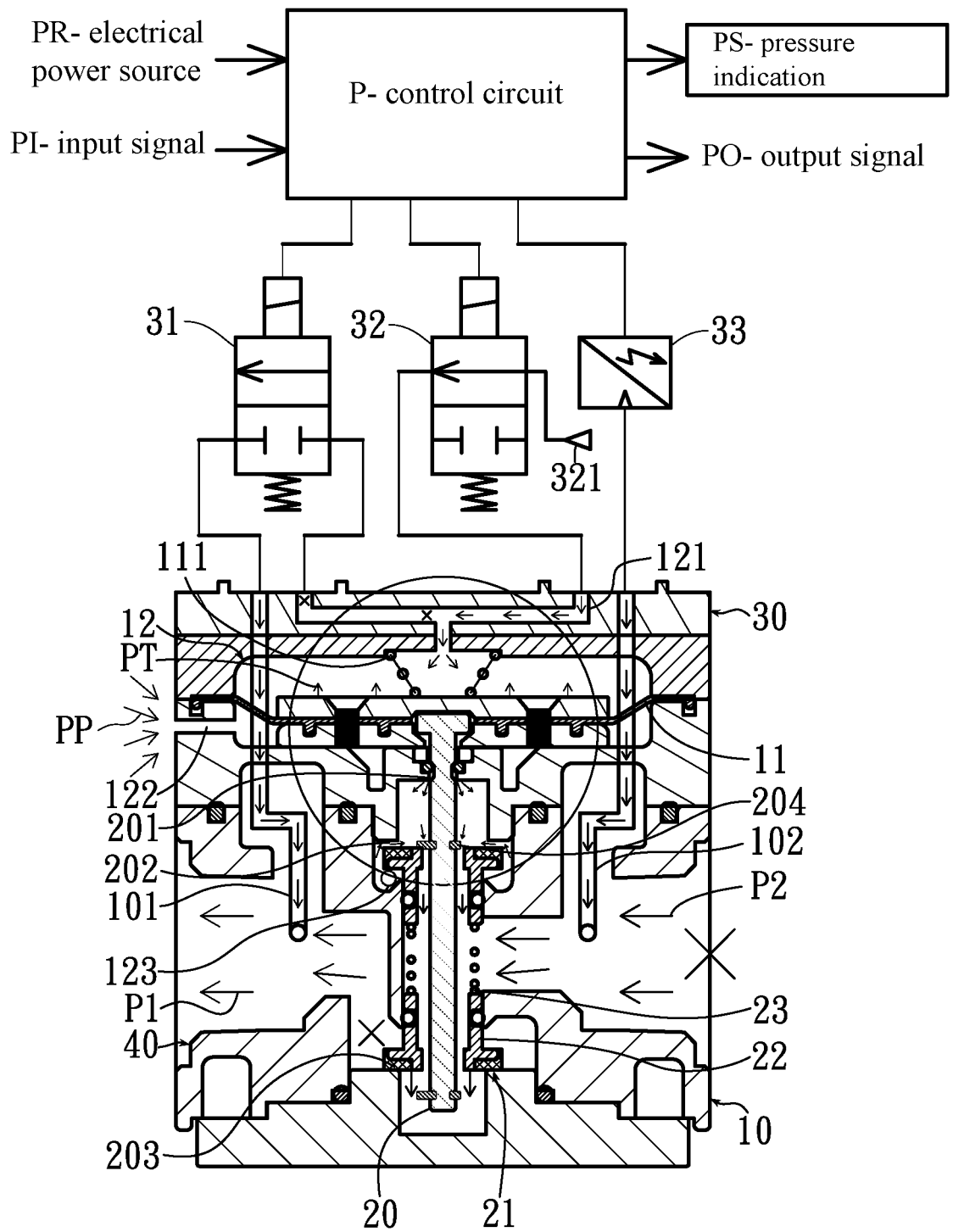
FIG. 9 is a schematic view illustrating a second stage of a vacuum destruction state of the present invention.
Figure 10:
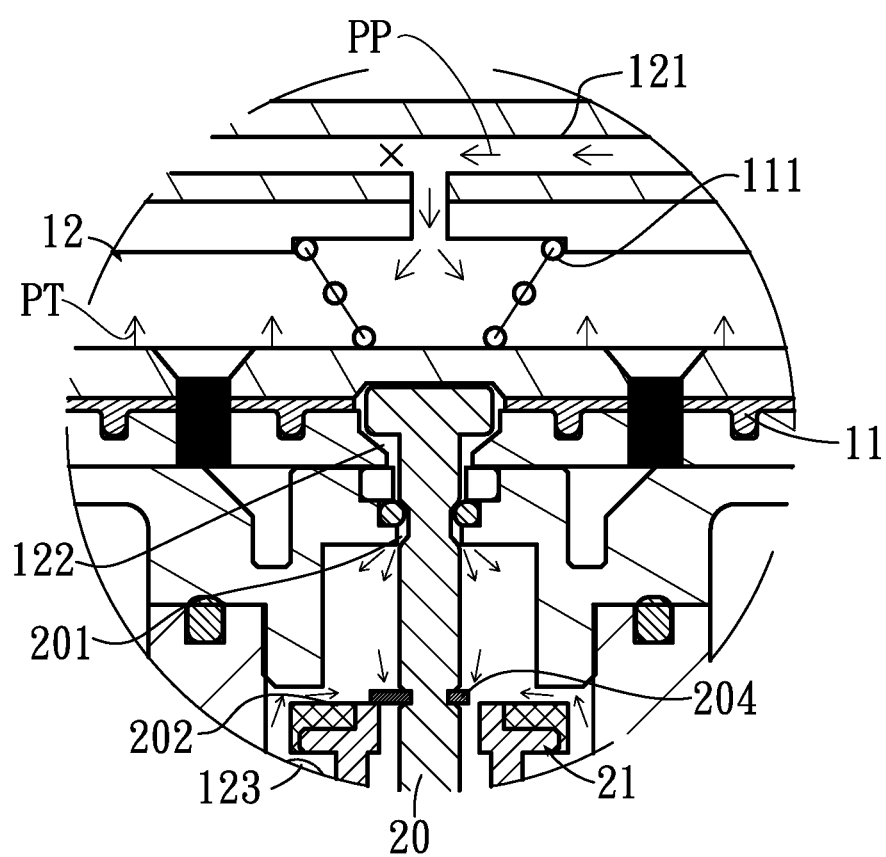
FIG. 10 is an enlarged view of a portion of FIG. 9 of the present invention.
Figure 11:
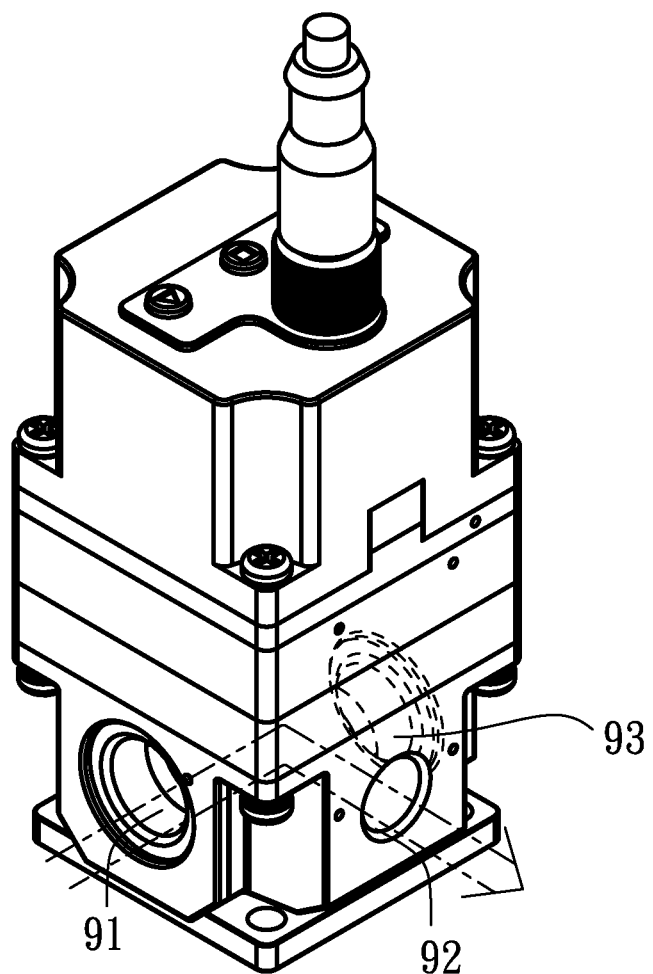
FIG. 11 is a schematic view showing prior art.

Referring to FIGS. 9 and 10 of the drawings, which is a second stage of vacuum destruction, with the atmospheric pressure electromagnetic valve (32) being activated, the atmospheric pressure (PP) is continuously conducted in through the atmospheric opening (321), causing the main diaphragm (11) to continue to move downward, and the position-constraining projecting pawl (204) of the pilot discharge straight rod (20) then pushes the second vacuum destruction valve gate (202) to open, and under such a condition, the atmosphere channel (123) under the second vacuum destruction valve gate (202) provides more the atmospheric pressure (PP) to enter, making the rate of adjusting the interior vacuum faster. When the main diaphragm (11) moves downward to reach a bottom of the vacuum pressure chamber (12), the flow of the atmospheric pressure (PP) entering through the pilot atmosphere channel (122) is reduced to a minimum and the flow of the atmospheric pressure (PP) entering through the atmosphere channel (123) is increased to reach a maximum.

In summary, the vacuum electrically controlled proportional valve of the present invention uses the pilot atmosphere channel (122) and the pilot discharge straight rod (20) to work with each other to allow external air to flow, by means of the first vacuum destruction valve gate (201) and the second vacuum destruction valve gate (202), to the secondary side pressure (P2) for making regulation in cooperation with vacuum so as to improve the response time of regulation and further simplifying the issue of inconvenience of tests caused by the complicated gas circuit of the prior art.

We claim:

1. A vacuum electrically controlled proportional valve, comprising:
   a valve seat, which is connected, at a top thereof, to a guide seat with a main diaphragm interposed between the guide seat and the valve seat to form a vacuum pressure chamber and an elastic element being provided on the main diaphragm, the main diaphragm being fit, at a center thereof, to a pilot discharge straight rod, the pilot discharge straight rod being provided with a vacuum valve gate assembly, the guide seat being further connected, on a top side thereof, to a vacuum pressure electromagnetic valve and an atmospheric pressure electromagnetic valve, and a sensor, and also has a regulation channel that is connected to and in communication with a top of the vacuum pressure chamber and is controlled by the vacuum pressure electromagnetic valve and the atmospheric pressure electromagnetic valve;
   a pilot atmosphere channel, which is formed in the valve seat and connected to and in communication with a space below the main diaphragm for an atmospheric pressure to flow;
   a master channel, which is provided between the valve seat and the guide seat, the master channel allowing a primary side pressure and a secondary side pressure to flow therein, the master channel being provided therein with a guide channel that is controlled by the vacuum pressure electromagnetic valve and a feedback channel that is connected to the sensor;
   wherein the pilot discharge straight rod is provided with a first vacuum destruction valve gate above the valve seat, and the vacuum valve gate assembly is provided on a top thereof, in combination with the pilot discharge straight rod, with a second vacuum destruction valve gate, wherein when the primary side pressure passes through the guide channel, in collaboration with an operation of the vacuum pressure electromagnetic valve to generate a vacuum pressure in the vacuum pressure chamber, the main diaphragm is forced upward and drives the pilot discharge straight rod to thereby drive a main valve gate on a lower part of the vacuum valve gate assembly to open, allowing the primary side pressure to pass through the main valve gate to form the secondary side pressure thereby achieving the purposes of vacuum suction, until the main diaphragm is moved downward to a horizontal position and the pilot discharge straight rod is caused to drive the main valve gate to close, and thus a steady pressure state is achieved; and wherein when the atmospheric pressure electromagnetic valve is activated to cause a pressures to apply, by way of the regulation channel, to cause the main diaphragm to move downward, the atmospheric pressure passes through the pilot atmosphere channel to the first vacuum destruction valve gate that is in an open state, allowing a part of the atmospheric pressure to pass, so as to reduce a power of vacuum suction, and when the atmospheric pressure is continuously input, the second vacuum destruction valve gate is caused to open, allowing more atmospheric pressure to pass, making a speed of increase of vacuum in the interior faster and further reducing a response time of vacuum suction.

2. The vacuum electrically controlled proportional valve according to claim 1, wherein the elastic element is a spring.

3. The vacuum electrically controlled proportional valve according to claim 1, wherein the vacuum valve gate assembly is formed of two convex members that are arranged with convex surfaces thereof facing each other and in combination with a spring, the convex members each having an interior made in a penetrating configuration to receive the pilot discharge straight rod to be fit therein, the pilot discharge straight rod being provided with a position-constraining projecting pawl at each of upper and lower portions of a circumference thereof in order to provide constraints to strokes of upward and downward movements of the pilot discharge straight rod.

* * * * *